United States Patent [19]
Wirth

[11] 3,862,555
[45] Jan. 28, 1975

[54] LOCKING REEL CONTAINER

[75] Inventor: Wayne M. Wirth, St. Paul, Minn.

[73] Assignee: Minnesota Mining and Manufacturing Company, St. Paul, Minn.

[22] Filed: Apr. 2, 1973

[21] Appl. No.: 347,188

[52] U.S. Cl. ...................... 70/63, 206/1.5, 206/405, 206/444

[51] Int. Cl. ...................... E05b 65/52, B65d 85/67

[58] Field of Search ....... 206/406, 405, 1.5; 312/20; 220/55 L; 70/63

[56] References Cited

UNITED STATES PATENTS

| | | | |
|---|---|---|---|
| 3,369,653 | 2/1968 | Edwards | 206/406 |
| 3,498,447 | 3/1970 | Edwards | 206/406 |
| 3,582,169 | 6/1971 | Koenig | 312/20 |
| 3,754,421 | 8/1973 | Wirth | 206/405 |

*Primary Examiner*—William T. Dixson, Jr.
*Attorney, Agent, or Firm*—Alexander, Sell, Steldt & DeLaHunt

[57] ABSTRACT

A reel storage container including a key-operated pin-tumbler lock mechanism for locking together separable portions of the container. The lock mechanism includes on one portion of the container opposed pivotally mounted locking members driven through a cam means by a key-operated rotatable plug and being thus movable between positions to engage or disengage a pin fixed to the other portion of the container to correspondingly lock or unlock the container.

3 Claims, 7 Drawing Figures

LOCKING REEL CONTAINER

BACKGROUND OF THE INVENTION

This invention relates to mechanisms for releasably closing a reel storage container.

Reels wound with magnetic tape bearing highly important and often irreplaceable magnetically encoded information or programs are stored at most computer centers. With increasing incidence such tapes have been fraudulently altered by dishonest employees or interlopers to afford enbezzlement by methods including manipulating input data, altering a computer program or routine, or altering or creating data files, all as is reported in an article entitled "Computer Security" in the January 1972 issue of "Data Management" published by Park House, Croydon, England. Additionally, information on such tapes may be inadvertently altered or erased by employees who select the wrong reel from a storage location. Heretofore, however, there have been few known reel storage containers which afford key-operated locking of their latching mechanisms.

SUMMARY OF THE INVENTION

A magnetic tape storage container according to the present invention affords key-operated locking of the storage container to restrict access by unauthorized individuals to a reel contained therein, and to aid in identifying important reels of encoded tape.

The invention improves the known types of latching mechanisms disclosed in U.S. Pat. Nos. 3,498,447 and 3,369,653 by incorporating therein a novel key-operated locking mechanism.

The locking mechanism includes a pair of pivotally mounted locking members driven through a cam means by a key-operated rotatable plug between positions to engage or disengage a pin fixed to the other portion of the container and correspondingly lock or unlock the container.

BRIEF DESCRIPTION OF THE DRAWING

The invention will be further described with reference to preferred embodiments thereof illustrated in the accompanying drawing wherein like numbers refer to like parts in the several views, and wherein:

FIG. 3 is a fragmentary sectional view taken along the lines 3—3 of FIG. 2 showing a pair of locking members in a spaced position;

FIG. 4 is a fragmentary sectional view taken along the lines 3—3 of FIG. 2 showing the locking members in an engaged position.

DESCRIPTION OF THE PREFERRED EMBODIMENTS

Figures 1, 2:
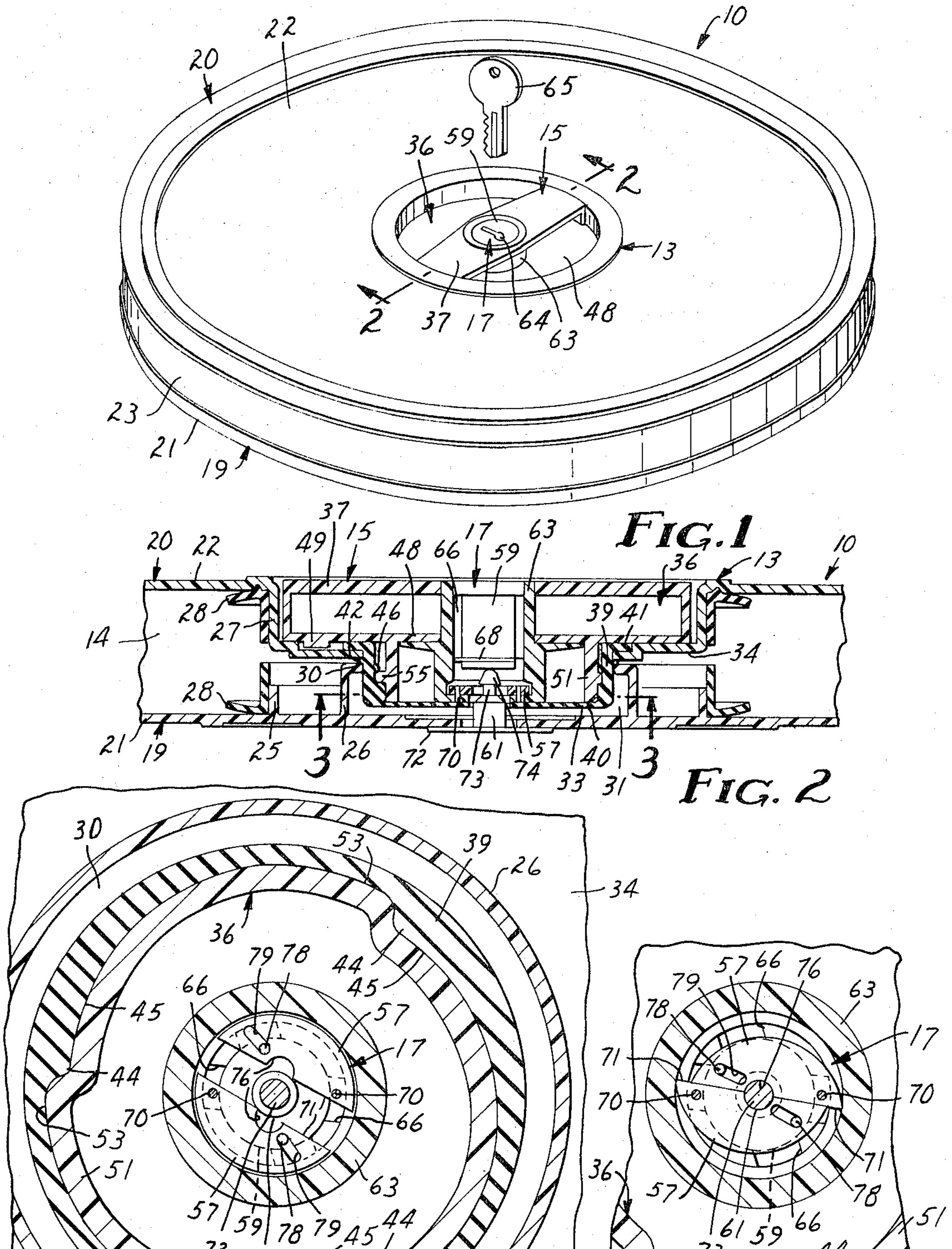
FIG. 1 is a perspective view of a first embodiment of a reel storage container according to the present invention.
FIG. 2 is an enlarged fragmentary sectional view taken approximately along the lines 2—2 of FIG. 1.

Referring now to the drawing there is illustrated in FIGS. 1 through 4 a first embodiment of a reel storage container according to the present invention, generally indicated by the numeral 10. The reel storage container 10 has separable mated portions forming a central hub 13 and a chamber 14 around the hub 13 adapted to receive a reel of tape (not shown), and has a latching mechanism 15 within the hub 13 which provides means for releasably coupling the portions of the container 10. The container 10 and its latching mechanism 15 are similar to the container disclosed in U.S. Pat. No. 3,498,447, the disclosure whereof is incorporated by reference herein, except for the improvement according to the present invention of a key-operated pin-tumbler locking mechanism 17.

The portions of the container 10 include a base 19 and a cover 20. The base 19 has a circular bottom wall 21 and an upwardly extending peripheral rim (not shown) for containing a reel of tape. The cover 20 has a circular top wall 22 with a downwardly extending peripheral rim 23 which fits outside the rim of the base 19 and abuts a sealing gasket ring on the edge of the bottom wall 21. As is best seen in FIG. 2, the bottom wall 21 has inner and outer inwardly projecting cylindrical walls 26 and 25 each concentric with the bottom wall 21. The circular top wall 22 has a concentric inwardly projecting cylindrical wall 27 opposed to and of the same diameter as the outer cylindrical wall 25 of the bottom wall 21, and each wall 25 and 27 has an annular resilient cushion ring 28 stretched around its periphery to provide a cushion seating for a reel of tape positioned within the contiiner 10.

The latching mechanism 15 includes the inner cylindrical wall 26 of the base 19 which has along its distal edge an inwardly projecting lip 30, and together with the bottom wall 21 forms a socket 31. A tapered resilient elastic cup 33 is attached in an opening in an inwardly extending flange 34 on the end of the cylindrical wall 27 of the cover 20, and projects into the socket 31 when the container 10 is closed.

A latch member 36 having a handle 37 adapted for manual engagement is mounted within the cup 33 for rotational movement between latching and releasing positions. The cup 33 and latch member 36 have members in engagement to expand the cup 33 within the socket 31 (FIG. 4) and retain the base 19 and cover 20 in the closed position when the latch member 36 is in the latching position, the members being out of engagement (FIG. 3) to afford separation or mating of the base 19 and cover 20 when the latch member 36 is in the releasing position.

The cup 33 has a generally cylindrical wall 39, an end wall 40 with a central opening, and a lip 41 and an axially spaced annular ring 42 projecting outwardly at the end opposite the end wall 40 to retain the cup 33 within the flange 34. The lip 41 has openings adapted to engage projections on the flange (not shown) to restrict rotation of the cup 33. The members of the cup 33 which afford expansion thereof includes three equally spaced radially inwardly extending projections 44 from the inner surface of the cylindrical wall 39. Each projection 44 has a camming surface 45 providing a smooth transition from the inner cylindrical surface of the cup to the innermost surface of the projection 44.

The cup 33 also has an inwardly projecting annular ring 46 adjacent the flange 34 (FIG. 2) for retaining the latch member 36 within the socket 31.

The latch member 36 includes a circular plate 48 adapted to slidably abut the adjacent surface of the lip 41, and formed integrally with the transverse handle 37. The latching and the releasing positions of the latch member 36 are indicated to a user by the limits of movement of a projection 49 formed on the side of the plate 48 opposite the handle 37 in a groove in the adjacent surface of the flange 34. The latch member 36 has a generally cylindrical lobate wall 51 projecting from the surface of the plate 48 opposite the handle 37. The lobes of the wall 51 provide three equally spaced camming surfaces 53 adapted, when the latch member 36 is in the releasing position, to nest with the three projections 44 with the cylindrical wall 39 of the cup 33 in an unstretched condition (FIG. 3). Upon rotation of the latch member 36 to the latch position, the camming surfaces 53 of the latch member 36 move along the camming surfaces 45 of the projections 44 moving the projections 44 radially outwardly and expanding the portion of the cup 33 within the socket 31 (FIG. 4), thus retaining the container 10 in the closed position. The lobate wall 51 also has an outwardly projecting annular ring 55 adapted to seat below the annular ring 46 projecting inwardly of the cup 33 to restrict axial movement of the latch member 36 from within the cup 33.

The key-operated pin-tumbler type locking mechanism 17 includes a pair of opposed pivotably mounted locking members 57 driven through a cam means by a key-operated rotatable plug 59 between positions to disengage or engage a pin 61 fixed to the base 19 of the container 10, and correspondingly lock or unlock the container 10.

The plug 59 is sold commercially by the Chicago Lock Company. The plug 59 is journaled for rotation within a central opening of a generally cylindrical housing 63 concentrically attached in and forming a portion of the latch member 36 and has an axially extending keyway 64 to afford engagement of a key 65 for operation thereof. Inserting the key 65 in the keyway 64 retracts spring biased tumblers within the plug 59 to afford rotation of the plug 59 approximately 65° between locked and unlocked positions, with the spring biased tumblers engaging grooves 66 in the housing 63 extending axially along the plug 59 at both positions of the plug 59 when the key 65 is removed. The plug 59 is restrained against axial movement from within the opening by a slidably mounted retaining ring 68 adjacent the inner end of the plug 59 and biased by a spring to a radially extended position in a circular groove around the housing.

The platelike locking members 57 are mounted in an enlarged cylindrical portion of the opening in the housing 63 at the end of the plug 59 adjacent the retaining ring 68. Each locking member 57 is mounted to an end wall of the housing 63 at a pivot shaft 70 for pivotal movement about an axis parallel to the axis of the plug 59 and latch member 36 between an engaged position (FIG. 4) with opposing surfaces 71 thereof in engagement and a separated position (FIG. 3) with the surfaces 71 spaced and the locking members 57 abutting the wall of the housing 63.

The pin 61 is coaxial with the bottom wall 21, and projects inwardly from a circular plate 72 attached thereto. When the base 19 and cover 20 are mated (FIG. 2) the pin 61 projects through the central opening in the end wall 40 of the cup 33 and has a cylindrical section 73 of reduced diameter adjacent its end and in the plane of the locking members 57. The cylindrical section 73 defines a head 74 at the end of the pin 61, and provides an opening in the pin so that the locking members 57 when moved to the engaged position will engage the pin 61 under its head 74 with the cylindrical section 73 positioned within a circular opening defined by cooperating openings 76 along the surface 71. Such engagement of the adjacent surfaces of the head 74 and locking members 57 will prevent separation of the base 19 and cover 20. In the separated position, the locking members 57 are sufficiently spaced to afford movement of the pin therebetween to separate or mate the base 19 and cover 20.

The cam means for pivoting the locking members 57 between the engaged and the separated positions upon corresponding rotation of the plug 59 between the locked and the unlocked positions includes a pair of drive pins 78 projecting from the end of the plug 59 adjacent the locking members 57 axially parallel to and equally spaced from the axis of the plug 59. The drive pins 78 project into slots 79 in the locking members 57, and the slots 79 are angularly disposed to afford the afore-mentioned movement of the locking members 57 upon rotation of the plug 59.

Figure 5:
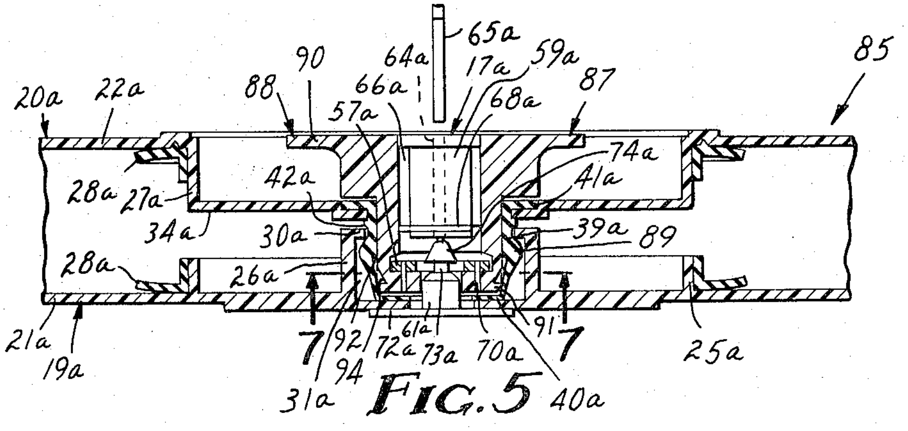
FIG. 5 is a fragmentary sectional view of a latching mechanism for a second embodiment of a reel storage container according to the present invention showing a latch member thereof in a latching position.
Figure 7:
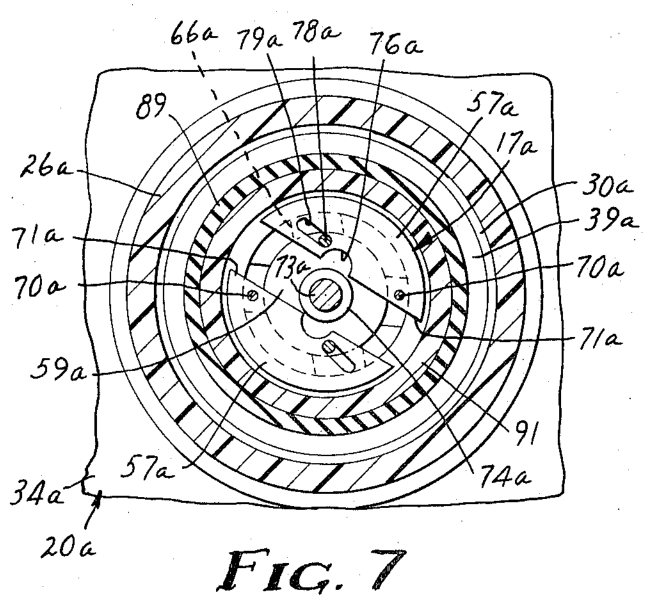
FIG. 7 is a fragmentary sectional view taken along the lines 7—7 of FIG. 5, showing a pair of locking members in a spaced position.
Figure 6:
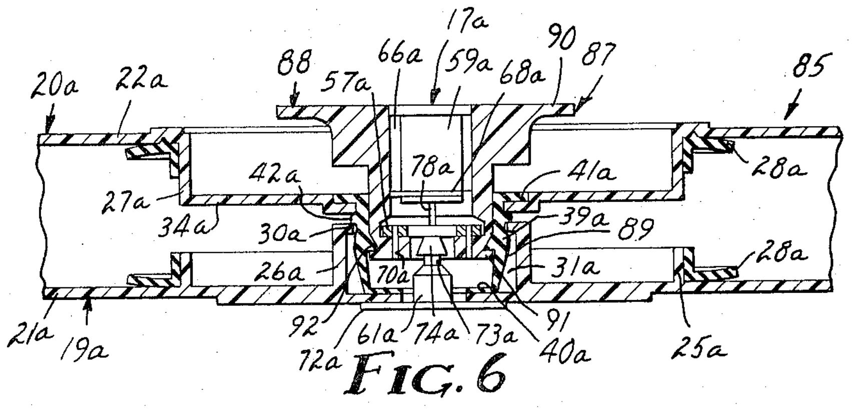
FIG. 6 is a fragmentary sectional view of the container of FIG. 5, showing the latching mechanism in a releasing position.

Referring now to FIGS. 5 through 7 there is shown the hub portion of a second embodiment of a reel container according to the present invention generally designated by the numeral 85. The container 85 generally corresponds to the container 10 and has similar parts similarly numbered. A key-operated locking mechanism 17*a* of the container 85 is essentially identical to the locking mechanism 17 of the container 10, and a latching mechanism 87 is similar to the latching mechanism 15 of the container 10 with the primary difference being that a latch member 88 of the second embodiment (which performs the function of the latch member 36 of the latching mechanism 15) is adapted for axial rather than rotational movement between the latching and the releasing position. The container 85 and its latching mechanism 87 are similar to the container disclosed in U.S. Pat. No. 3,369,653, the disclosure whereof is incorporated by reference herein, except for the improvement according to the present invention of the key-operated pin-tumbler lock mechanism 17*a*.

The container 85 has separable portions including a base 19*a* having a circular bottom wall 21*a*, and a cover 20*a* having a circular top wall 22*a*. Opposing cylindrical walls 25*a* and 27*a* project inwardly from the respective bottom and top walls 21*a* and 22*a* to define a hub for the container 85 and support cushion rings 28*a* for a reel positioned therein.

The latching mechanism 87 includes a cylindrical wall 26*a* having an inwardly projecting lip 30*a* which with the bottom wall 21*a* forms a socket 31*a* which receives a tapered resilient elastic cup 89 attached to a flange 34*a* of the cover 20*a* when the container 85 is closed.

The latch member 88 has a circular handle 90 adapted for manual engagement and a coaxial cylindrical end 91 mounted within the cup 89 for axial movement from an inner latching position with members of the cup 89 and latch member 88 in engagement to expand the cup 89 within the socket 31*a* and retain the base 19*a* and cover 20*a* in the closed position (FIG. 5); and a releasing position with the members out of engagement and the cup 89 in an unexpanded condition to afford separation or mating of the base 19*a* and cover 20*a* (FIG. 6).

The cup 89 has a generally cylindrical wall 39*a*, an end wall 40*a* with a central opening, and a lip 41*a* and an axially spaced annular ring 42*a* projecting outwardly at the end opposite the end wall 40 to retain the cup 89 within the flange 34*a*. The member of the cup 89 which affords expansion thereof is an annular projection 92 projecting radially inwardly from the inner surface of the cylindrical wall 39*a*.

The cylindrical end 91 of the latch member 88 has an annular groove 94 adjacent its end opposite the handle 90. The groove 94 is adapted to receive the projection 92 and allow the cup 89 to assume its unexpanded condition when the latch member 88 is in the outer releasing position (FIG. 6). When the cylindrical end 93 is moved inwardly of the cup 89, however the projection 92 is cammed outwardly by interacting inclined surfaces of the projection 92 and latch member 88 to expand the cup 89 within the socket 31*a* as the projection 92 moves onto the periphery of the cylindrical end 93 adjacent the groove 94 (FIG. 5). When the latch member 88 is in the releasing position (FIG. 6), surfaces of the latch member 88 and projection 92 extending generally normal to the axis of the latch member 88 are in contact, thereby restricting removal of the latch member 88 from the cup 89.

As in the container 10, the key-operated pin-tumbler type locking mechanism 17*a* of the container 88 includes a pair of opposed pivotably mounted locking members 57*a* driven through a cam means by a key-operated rotatable plug 59*a* between positions to disengage or engage a pin 61*a* fixed to the base 19*a* of the container 85, and correspondingly lock or unlock the container 85.

The plug 59*a* is journaled for rotation within a central opening in the latch member 88. The plug 59*a* has an axially extending keyway 64*a* adapted to receive a key 65*a* which retracts spring biased tumblers from one of two axially extending grooves 66*a* in the latching member 88 and affords rotation of the plug 59 approximately 65 degrees between locked and unlocked positions. The plug 59*a* is restrained against axial movement from within the opening by a slidably mounted retaining ring 68*a* biased by a spring to a radially extended position in an annular groove in the latch member 88.

The platelike locking members 57*a* are mounted in an enlarged cylindrical portion of the opening in the latch member 88 at the end of the plug 59*a* adjacent the retaining ring 68*a*. Each locking member 57*a* is mounted to an end wall of the latch member 88 at a pivot shaft 70*a* for pivotal movement about an axis parallel to the axis of the plug 59*a* between an engaged position (not shown) with opposing surfaces 71*a* thereof in engagement and (when the cover 20*a* and base 19*a* are mated) the locking members 57*a* in an opening adjacent a head 74*a* of the pin 61*a* with a cylindrical section 73*a* of the pin 61*a* positioned in cooperating openings 76*a* along the surfaces 71*a;* and a separated position with the surfaces 71*a* separated defined by abutment of the locking members 57*a* against the wall of the latch member 88 to afford movement of the pin 61*a* therebetween to separate or mate the base 19*a* and cover 20*a* (FIG. 7).

A pair of drive pins 78*a* project from the end of the plug 59*a* adjacent the locking members 57*a* axially parallel to and equally spaced from the axis of the plug 59*a*. The drive pins 70*a* project into slots 79*a* in the locking members 57*a*, and the slots 79*a* are angularly disposed so that the combination provides cam means for pivoting the locking members 57*a* between the engaged and the separated positions upon corresponding rotation of the plug 59*a* between the locked and the unlocked positions.

Having thus described two embodiments of the present invention, what is claimed is:

1. In a reel storage container having separable mated portions forming a centrally located hub having an axis and a chamber around the hub adapted to receive a reel and latch means coaxially centered within the hub for releasably coupling the portions including a socket in one portion having an inwardly projecting annular ring, a resilient cup supported on the other portion and positioned within the socket when the portions are mated, and a latch member mounted within the cup for movement from a latching to a releasing position, said cup and latch member having members in engagement to expand the cup within the socket and retain the container portions in the closed position when the latch member is in the latching position, and out of engagement to afford separation of the container portions when the latching member is in the releasing position, the improvement wherein:

said container includes a key-operated pin-tumbler lock mechanism including:

a plug mounted in the latch member for rotation about said axis via said key between locked and unlocked positions;

a pair of locking members mounted on the latch member for pivotal movement about axes parallel to the axis of the plug in opposed directions between engaged and separated positions;

cam means engaged between said plug and said locking members for correspondingly moving the locking members between their engaged and separated positions upon rotation of the plug between the locked and unlocked positions; and a pin fixed to the base coaxially with said hub and having a projecting end adapted for engaging from opposite sides by the locking member when said container portions are mated and said locking members are moved to their engaged position, the locking members when in their separated position being spaced and out of engagement with said pin to afford axial movement of the pin therebetween and separation of the container portions.

2. A container according to claim 1, wherein said latch member is mounted for rotation about the axis through said hub between said latching and releasing positions, said pin has a head on said projecting end and a cylindrical section of smaller diameter than said head between said head and said base and the locking members engage the pin around said cylindrical section when in their engaged position.

3. A container according to claim 1, wherein said latch member is mounted for movement along the axis through said hub between said latching and releasing positions, said pin has a head on said projecting end and a cylindrical section of smaller diameter than said head between said head and said base and the locking members engage the pin around said cylindrical section when in their engaged position.

* * * * *

UNITED STATES PATENT OFFICE

CERTIFICATE OF CORRECTION

PATENT NO. : 3,862,555

DATED : January 28, 1975

INVENTOR(S) : Wayne M. Wirth

It is certified that error appears in the above-identified patent and that said Letters Patent are hereby corrected as shown below:

Column 1, line 57, "FIG. 5" should start a new paragraph.

Column 2, line 35, change "contiiner" to -- container --, and line 62, change "includes" to -- include --.

Column 6, line 45, change "engaging" to -- engagement --.

Signed and Sealed this

*second* Day of *September 1975*

[SEAL]

*Attest:*

RUTH C. MASON
*Attesting Officer*

C. MARSHALL DANN
*Commissioner of Patents and Trademarks*